(12) United States Patent
Kronenberg

(10) Patent No.: US 10,816,127 B2
(45) Date of Patent: Oct. 27, 2020

(54) ANTI-KINK DEVICE FOR A HOSE

(71) Applicant: SARTORIUS STEDIM BIOTECH GMBH, Goettingen (DE)

(72) Inventor: Diana Kronenberg, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 3 days.

(21) Appl. No.: 16/329,266

(22) PCT Filed: Aug. 17, 2017

(86) PCT No.: PCT/EP2017/070849
§ 371 (c)(1),
(2) Date: Feb. 28, 2019

(87) PCT Pub. No.: WO2018/046273
PCT Pub. Date: Mar. 15, 2018

(65) Prior Publication Data
US 2019/0249814 A1 Aug. 15, 2019

(30) Foreign Application Priority Data
Sep. 9, 2016 (DE) .................. 10 2016 116 991

(51) Int. Cl.
*F16L 57/02* (2006.01)

(52) U.S. Cl.
CPC .................. *F16L 57/02* (2013.01)

(58) Field of Classification Search
CPC ........................................ F16L 57/02
USPC .......................... 138/106, 110, 177
See application file for complete search history.

(56) References Cited

U.S. PATENT DOCUMENTS

| | | | |
|---|---|---|---|
| 7,100,641 B2 * | 9/2006 | Tyrer | F16L 1/123 138/110 |
| 9,261,222 B2 | 2/2016 | Lorraine et al. | |
| 2005/0184509 A1 | 8/2005 | Crook | |
| 2008/0257440 A1 * | 10/2008 | Ikeda | H02G 3/0475 138/110 |
| 2012/0304447 A1 * | 12/2012 | Smith | F16L 1/123 29/434 |
| 2013/0133772 A1 * | 5/2013 | Lorraine | F16L 57/02 138/110 |
| 2017/0328509 A1 * | 11/2017 | Meijer | H02G 1/10 |

FOREIGN PATENT DOCUMENTS

| | | |
|---|---|---|
| DE | 9218100 U1 | 7/1993 |
| DE | 19716232 A1 | 5/1998 |
| DE | 60204937 T2 | 4/2006 |
| DE | 102006039525 A1 | 2/2008 |
| DE | 202008008547 U1 | 11/2008 |
| DE | 202010005482 U1 | 8/2011 |
| DE | 102013208527 A1 | 11/2014 |
| DE | 102015201829 A1 | 1/2016 |
| EP | 1882867 A2 | 1/2008 |
| GB | 2413219 A | 10/2005 |
| GB | 2485249 A | 5/2012 |

* cited by examiner

*Primary Examiner* — Patrick F Brinson
(74) *Attorney, Agent, or Firm* — Dilworth IP, LLC

(57) ABSTRACT

An anti-kink device for a hose has a strip-shaped base body, at least one fastening protrusion protruding from the base body and at least one fastening depression provided in the base body. The fastening protrusion is configured such that it can engage into the at least one fastening depression.

16 Claims, 2 Drawing Sheets

ANTI-KINK DEVICE FOR A HOSE

This invention relates to an anti-kink device for a hose.

BACKGROUND OF THE INVENTION

Anti-kink devices for hoses are intended to prevent that kinks are formed in hoses, which reduce the hose cross-section of the hose or which lead to a damage of the hose wall. Anti-kink devices for hoses or cable strands, which are known for example from DE 10 2013 208 527 A1, DE 10 2015 201 829 A1, DE 602 04 937 T2, DE 92 18 100 U1, GB 2 413 219 A or U.S. Pat. No. 9,261,222 B2, usually include a plurality of components that are pivotally or rotatably connected to each other, so as not to impair the flexibility of the hose or the cable strand. The individual parts of such anti-kink devices, however, are rigid and each completely enclose the hose or cable strand to be protected in circumferential direction.

Due to the great number of parts and the necessarily flexible connection of the parts among each other by hinges, joints or screws, usual anti-kink devices are costly to produce and expensive to assemble.

SUMMARY OF THE INVENTION

Thus, it is the object of the invention to provide an anti-kink device that is both inexpensive to manufacture and easy to assemble.

This object is achieved by an anti-kink device for a hose, comprising a strip-shaped base body, at least one fastening protrusion protruding from the base body, and at least one fastening depression provided in the base body, wherein the fastening protrusion is configured such that it can engage into the at least one fastening depression.

Due to the strip-shaped design of the base body with two free ends it is not necessary to manufacture a closed ring, so that the production is simplified. The strip-shaped base body also provides for an easy assembly of the anti-kink device, because by means of the fastening protrusion and the fastening depression the base body can safely and easily be connected to a ring. The strip-shaped base body also provides for mounting the anti-kink device on hoses that are mounted already in installations.

According to a fundamental preferred embodiment of the anti-kink device according to the invention, the strip-shaped base body has a first surface from which the at least one fastening protrusion protrudes, and an opposite second surface in which the at least one fastening depression is provided. In this way, it is ensured that the anti-kink device is mounted without any torsions of the base body.

Preferably, the at least one fastening protrusion is provided at a free end of the strip-shaped base body in the vicinity of a first transverse side of the base body, and the at least one fastening depression is provided at the opposite free end of the strip-shaped base body in the vicinity of a second transverse side of the base body. Due to the strip-shaped configuration of the base body, the base body has a rectangular shape with a longitudinal direction and a transverse direction shorter than the longitudinal direction. The transverse sides are those sides of the base body that extend in transverse direction and hence delimit the base body in longitudinal direction, i.e. the transverse sides correspond to the end faces of the two free ends of the strip-shaped base body. Due to the fact that the fastening protrusion and the fastening depression are provided at both free ends in the vicinity of the transverse sides of the base body, the entire length of the base body can be utilized.

In one embodiment of the invention, the wall of the at least one fastening depression at the same time represents the wall of the at least one fastening protrusion, whereby the anti-kink device can be manufactured in a material-saving way.

Preferably, the at least one fastening protrusion and the at least one fastening depression are manufactured by deforming the base body, in particular by deep-drawing, so that the anti-kink device can be manufactured at low cost.

Preferably, the anti-kink device is formed as one piece, whereby the manufacture is further simplified.

The anti-kink device can be made of only one single material. This allows to further reduce the manufacturing costs. The anti-kink device preferably is made of a plastic material, particularly preferably of polypropylene (PP), polyethylene (PE), polyethylene terephthalate (PET) or of combinations of the aforementioned materials.

In a preferred embodiment of the invention the shape of the at least one fastening protrusion has an approximately rectangular base area, whereby the anti-kink device is easy to manufacture. The rectangular base area can have rounded or fluted corners. Alternatively, the shape of the fastening protrusion has an approximately circular, triangular, elliptical or polygonal base area.

Preferably, the longitudinal direction of the base area of the fastening protrusion is oriented substantially perpendicular to the longitudinal direction of the base body so that in the longitudinal direction of the base body the fastening protrusion can absorb forces over a large surface area.

Preferably, the shape of the at least one fastening protrusion tapers in at least one direction proceeding from the base body, whereby the introduction of the fastening protrusion into the fastening depression is facilitated.

In one design variant, the shape of the at least one fastening protrusion is designed flat on its upper side facing away from the base body. The flat upper side is parallel to the base body. In the mounted condition of the anti-kink device the flat upper side of the fastening protrusion thus can serve as a bearing surface for the hose wall to support and bear the hose.

In another embodiment of the invention the shape of the at least one fastening protrusion has an inclined guide surface that adjoins the upper side and that declines towards the base body, whereby the fastening protrusion is aligned automatically on introduction into the fastening depression. In addition, an inclined guide surface provides for a releasable, i.e. reversible, engagement of the fastening protrusion into a complementary fastening depression, whereby opening of the anti-kink device after use and its reuse for another hose are facilitated.

Preferably, the at least one fastening depression has a shape that is complementary to the shape of the at least one fastening protrusion so that a precise fit of the fastening protrusion in the fastening depression becomes possible.

In another embodiment of the invention a plurality of fastening protrusions and/or fastening depressions are provided, which are provided along the longitudinal direction of the base body. Due to the fact that the fastening protrusion can engage into various fastening depressions or various fastening protrusions are provided, the strip-shaped base body can be shaped to a ring with various diameters. Thus, the anti-kink device can be mounted on hoses with various diameters. Each of the fastening protrusions can engage into each of the fastening depressions, in particular all fastening protrusions and fastening depressions have the same or a complementary shape. It is also conceivable that beside the fastening protrusions and the fastening depressions further protrusions and depressions are provided, for example in order to support the hose.

Preferably, the plurality of fastening protrusions and the plurality of fastening depressions are configured such that a plurality of fastening protrusions at the same time can each engage into one of the plurality of fastening depressions, whereby a particularly safe connection is created, which renders the ring formed of the anti-kink device particularly stable.

In one embodiment of the invention the anti-kink device is made of a material that withstands sterilization methods, in particular a sterilization by gamma irradiation, by treatment with ethylene oxide (ETO), or by applying electron rays or hot steam. In this way, the anti-kink device is suitable for medical or biopharmaceutical applications and in particular for single use.

BRIEF DESCRIPTION OF THE DRAWINGS

Further features and advantages of the invention can be taken from the following description and from the attached drawings to which reference is made. In the drawings.

DETAILED DESCRIPTION OF THE INVENTION

Figure 1:
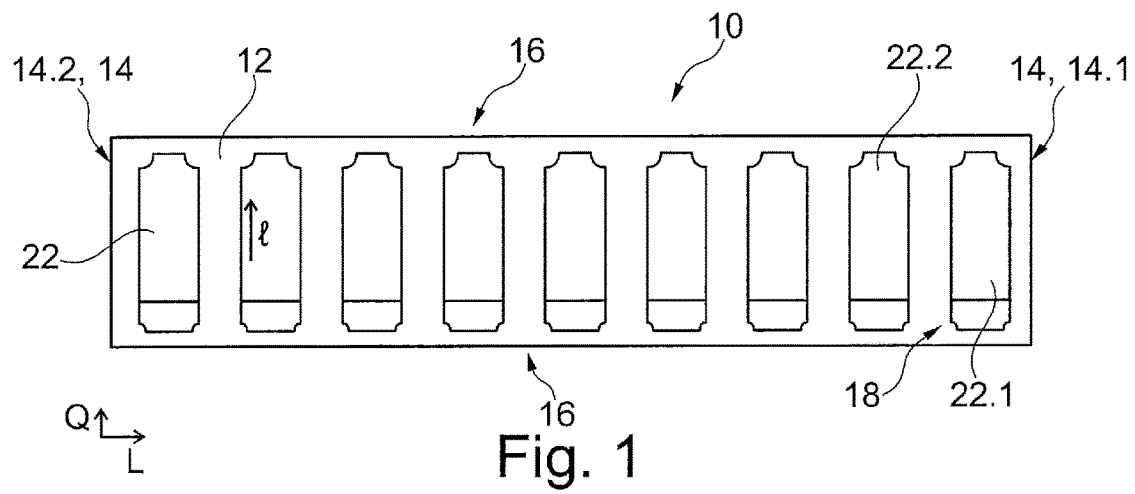
FIG. 1 shows an anti-kink device according to the invention in a top view.
Figure 2:
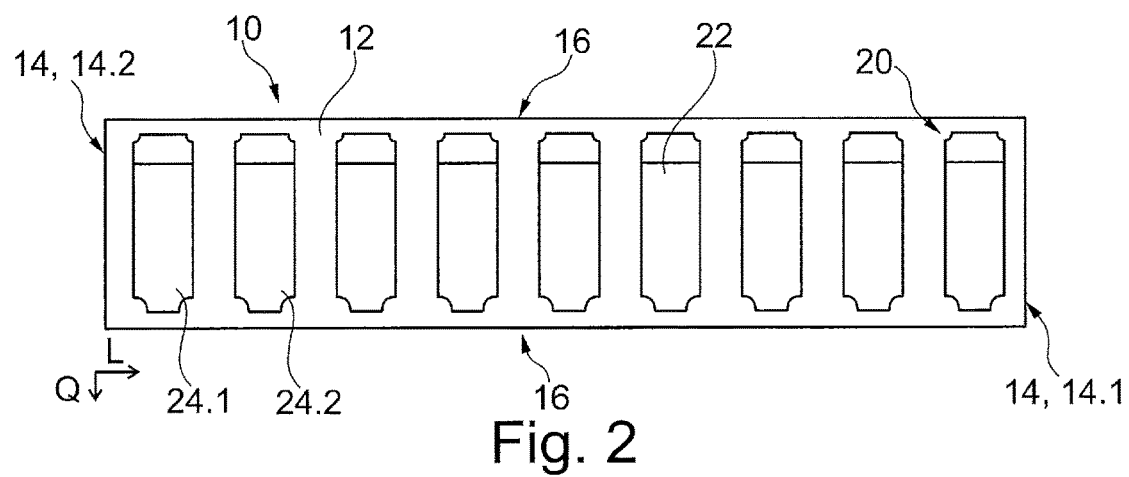
FIG. 2 shows the anti-kink device of FIG. 1 in a bottom view.

FIGS. 1 and 2 show an anti-kink device 10 for a hose with a base body 12.

The anti-kink device 10 is designed in one piece and made of only one single material.

The material can be chosen such that it withstands sterilization methods, in particular a sterilization by gamma irradiation, by treatment with ethylene oxide (ETO) or by applying electron rays or hot steam. Preferably, it is a plastic material such as polypropylene (PP), which tolerates a hot steam treatment, or alternatively polyethylene (PE) or polyethylene terephthalate (PET), which tolerate the other aforementioned sterilization methods.

The base body 12 has a rectangular shape and thus is configured strip-shaped with two free ends. The base body 12 therefore has a longitudinal direction L and a transverse direction Q.

The extension of the base body 12 in longitudinal direction L is greater than in transverse direction Q.

The sides along the transverse direction Q at the two free ends of the base body 12 are the transverse sides 14 of the base body 12, and the sides along the longitudinal direction L are the long sides 16 of the base body 12.

Figure 3:
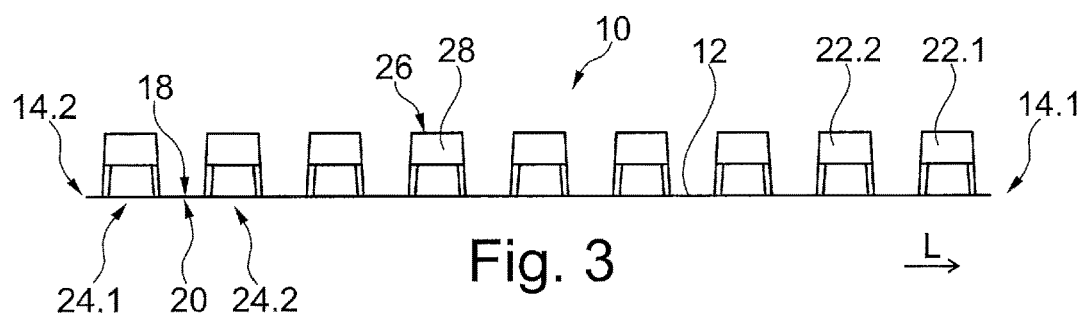
FIG. 3 shows the anti-kink device of FIG. 1 in a front view of a long side.

As can be seen in FIG. 3, the base body 12 has a first surface 18 and an opposite second surface 20.

Fastening protrusions 22 protrude from the first surface 18. In the illustrated embodiment there are nine fastening protrusions 22.

In the second surface 20 a plurality of fastening depressions 24 are provided, wherein each fastening depression 24 corresponds to a fastening protrusion 22 on the first surface 18. Thus, nine fastening depressions 24 also are provided in the illustrated embodiment.

The fastening protrusions 22 and the fastening depressions 24 each extend in transverse direction Q and are formed one beside the other in parallel along the entire longitudinal extension of the base body 12 in longitudinal direction L.

In the illustrated exemplary embodiment, the distances between adjacent fastening protrusions 22 or fastening depressions 24 are equal. Alternatively, the distances can also be unequal.

At both free ends of the base body 12 a fastening protrusion 22 and a fastening depression 24 are provided in the vicinity of the respective transverse side 14. For better distinction, the transverse side 14 at the first free end of the base body 12 is referred to as transverse side 14.1 and the transverse side 14 at the opposite second free end is referred to as second transverse side 14.2.

The fastening protrusions 22 and the fastening depressions 24 are made by deep-drawing the base body 12 so that with one fastening protrusion 22 a fastening depression 24 also is produced in the base body 12 at the same time.

Correspondingly, the wall of one of the fastening protrusions 22 at the same time is the wall of the corresponding fastening depression 24, and the shapes of the fastening depressions 24 are complementary to the shapes of the fastening protrusions 22, similar to negative-positive molds.

In the following the shape of the fastening protrusions 22, which all are identical in design, will now be discussed. Due to the complementary shape of the fastening depressions 24, the shape of the fastening depressions 24, however, will also be described implicitly.

The fastening protrusions 22 have an approximately rectangular base area, wherein in the illustrated embodiment the corners of the rectangle are fluted.

The longitudinal direction I of the base area of the fastening protrusions 22 is substantially perpendicular to the longitudinal direction L of the base body 12, i.e. parallel to the transverse direction Q of the base body 12.

The portions of the fastening protrusions 22 protruding from the first surface 18 are completely closed and beside an upper side 26 have side walls all around.

The upper side 26 is of flat design and extends parallel to the base body 12.

To prevent the anti-kink device 10 from slipping off the hose, the upper side 26 can be roughened.

As can be seen in FIG. 3, the shape of the fastening protrusions 22 tapers from the base body 12 in the direction that perpendicularly points away from the first surface 18. Therefore, the extension of the fastening protrusions 22 in the longitudinal direction L of the base body 12 is greater than on its upper side 26 close to the first surface 18 of the base body 12.

Figure 4:
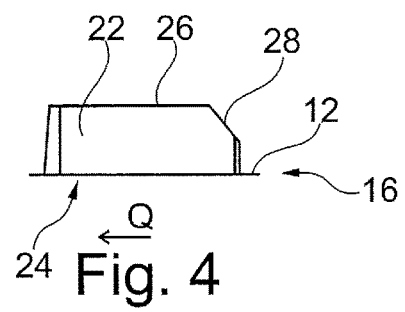
FIG. 4 shows a side view of a transverse side of the anti-kink device of FIG. 1.

The shape of the fastening protrusions 22 also tapers in the transverse direction Q of the base body 12 proceeding from the base body 12, as can be seen in FIG. 4.

The shape of the fastening protrusions 22 also includes a guide surface 28 which in the representation of FIG. 4 adjoins the upper side 26 on the right side.

The guide surface 28 is arranged obliquely to the base body 12 and to the upper side 26 and proceeding from the upper side 26 declines in the direction of the long side 16 towards the base body 12. The inclined guide surface 28 provides for a releasable, i.e. reversible, engagement of the fastening protrusion 22 into a complementary fastening depression 24, whereby opening of the anti-kink device after use and its reuse for another hose are facilitated.

Figure 5:
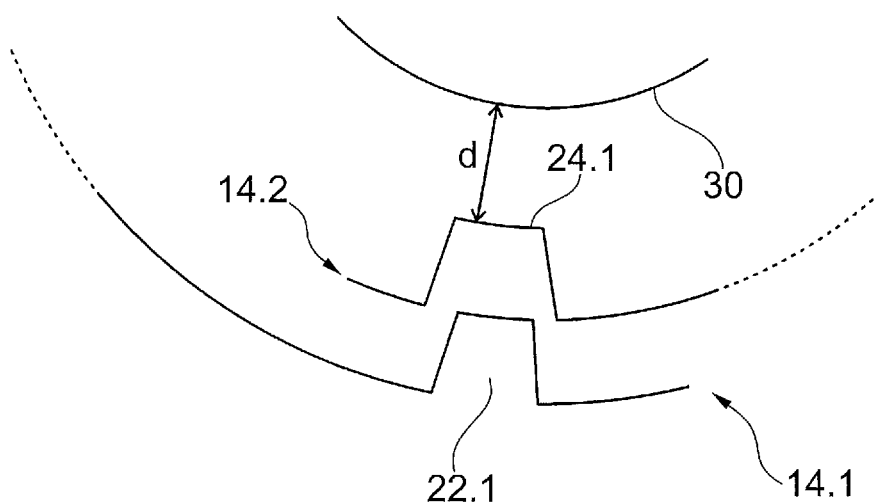
FIG. 5 shows a front view of an anti-kink device placed loosely around a hose in an open configuration in which a terminal fastening protrusion does not yet engage into a terminal fastening depression.

In FIG. 5, the anti-kink device 10 is shown in a still open configuration placed loosely around the hose 30, in which a terminal fastening protrusion 22.1 of the first transverse side 14.1 already is in spatial vicinity to a terminal fastening depression 24.1 of the second transverse side 14.2 and in which the fastening protrusion 22.1 does not yet engage into the fastening depression 24.1. In this open configuration, the fastening protrusions 22 of the anti-kink device do not yet supportingly rest against a hose 30, which is illustrated by the distance d.

Figure 6:
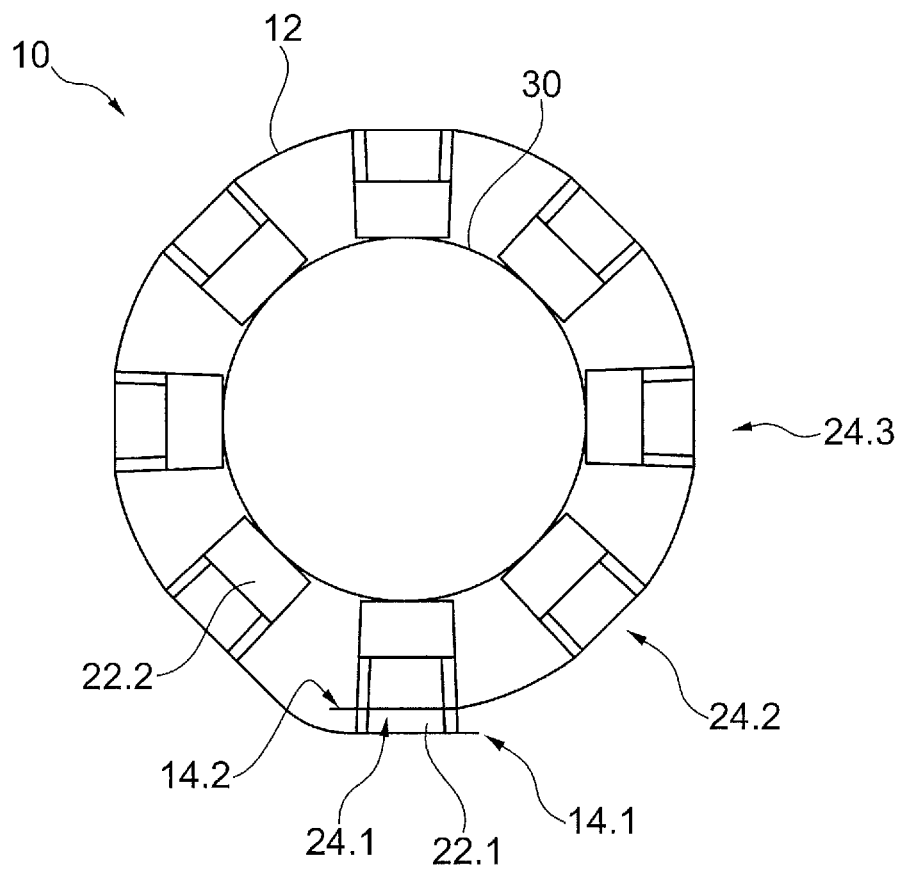
FIG. 6 shows a front view of an anti-kink device mounted around a hose according to FIG. 1 and FIG. 5 in a closed configuration in which the terminal fastening protrusion engages into the terminal fastening depression.

FIG. 6 shows the anti-kink device 10 of FIG. 5 in the mounted position around the hose 30.

Fastening the free ends of the base body 12 to each other is effected by that fastening protrusion 22 that is arranged on the first transverse side 14.1, and by that fastening protrusion 24 that is provided on the second transverse side 14.2. For simplification, the fastening protrusion 22 on the first transverse side 14.1 is referred to as first fastening protrusion 22.1 and the fastening depression 24 on the second transverse side 14.2 is referred to as last fastening depression 24.1

The first fastening protrusion 22.1 is introduced into the last fastening depression 24.1 so that the base body 12 is connected at its free ends and describes a closed ring in which the free ends of the strip-shaped base body 12 ultimately overlap.

The guide surfaces 28 align the first fastening protrusion 22.1 in the last fastening depression 24.1.

The ring obtained in this way tightly surrounds the hose 30, and the upper sides 26 of each of the fastening protrusions 22 rest against the hose 30. The hose 30 is supported by the fastening protrusions 22 and it thus is prevented that the hose 30 can kink.

To fasten the anti-kink device 10 to a hose 30 with a smaller diameter, the first fastening protrusion 22.1 can be introduced into the fastening depression 24.2 adjacent to the last fastening depression 24.1. The diameter of the anti-kink device 10 formed into a ring thereby is reduced.

Alternatively, the fastening protrusion 22.2 adjacent to the first fastening protrusion 22.1 can itself be introduced into the last fastening depression 24.1. The base body 12 thereby is also connected to a ring, which now has a smaller diameter.

It is of course also conceivable that the fastening protrusions 22.1 and 22.2 engage into the fastening depressions 24.2 and 24.1, respectively, whereby a particularly safe connection of the free ends of the base body 12 is achieved.

A ring or an anti-kink device 10 with even smaller diameter can likewise be produced by continuing the described connection, for example by introducing the first fastening protrusion 22.1 into the third from last fastening depression 24.3, etc.

Other geometries of the fastening protrusions 22 or fastening depressions 24 also are conceivable; in particular, the base body 12 can be expanded more in transverse direction Q so as to protect a longer portion of the hose 30 from kinking.

Of course, beside the fastening protrusions 22 and the fastening depressions 24 further protrusions or depressions can be provided, which contribute to the stability of the base body 12 or which support the hose 30.

The engagement of the fastening protrusions 22 into the fastening depressions 24 either can be effected unreleasably, i.e. irreversibly, or releasably, i.e. reversibly. The unreleasable variant is suitable in particular for single-use hoses which after use are disposed of together with the anti-kink device.

To protect the hose 30 at several points, it is of course also possible to use a plurality of anti-kink devices 10 and arrange the same at the corresponding points.

The invention claimed is:

1. An anti-kink device for a hose, comprising a strip-shaped base body placed about the hose, the strip-shaped base body including at least one fastening protrusion protruding from the base body, and at least one fastening depression provided in the base body, wherein the fastening protrusion is configured such that it can engage into the at least one fastening depression, wherein a wall of the at least one fastening depression also serves as a wall of the at least one fastening protrusion, such that the hose is tightly supported by the anti-kink device.

2. The anti-kink device according to claim 1, wherein the strip-shaped base body has a first surface, from which the at least one fastening protrusion protrudes, and an opposite second surface in which the at least one fastening depression is provided.

3. The anti-kink device according to claim 1, wherein the at least one fastening protrusion is provided at a free end of the strip-shaped base body in the vicinity of a first transverse side of the base body and the at least one fastening depression is provided at an opposite free end of the strip-shaped base body in the vicinity of a second transverse side of the base body.

4. The anti-kink device according to claim 1, wherein the at least one fastening protrusion and the at least one fastening depression are made by deforming the base body.

5. The anti-kink device according to 1, wherein the anti-kink device is formed as one piece.

6. The anti-kink device according to 1, wherein the anti-kink device is made of only one single material.

7. An anti-kink device for a hose, comprising a strip-shaped base body placed about the hose, the strip-shaped base body including at least one fastening protrusion protruding from the base body, and at least one fastening depression provided in the base body, wherein the fastening protrusion is configured such that it can engage into the at least one fastening depression wherein the shape of the at least one fastening protrusion has an approximately rectangular base area, wherein the longitudinal direction (I) of the base area is oriented substantially perpendicular to the longitudinal direction (L) of the base body, such that the hose is tightly supported by the anti-kink device.

8. The anti-kink device according to claim 1 wherein the shape of the at least one fastening protrusion tapers in at least one direction proceeding from the base body.

9. The anti-kink device according to claim 1, wherein the shape of the at least one fastening protrusion is designed flat on its upper side facing away from the base body.

10. The anti-kink device according to claim 1, wherein the shape of the at least one fastening protrusion includes an inclined guide surface which guide surface adjoins an upper side of the at least one fastening protrusion and which declines towards the base body.

11. The anti-kink device according to claim 1, wherein the at least one fastening depression has a shape that is complementary to the shape of the at least one fastening protrusion.

12. The anti-kink device according to claim 1 wherein a plurality of fastening protrusions and/or fastening depressions are provided, which are provided along the longitudinal direction (L) of the base body.

13. The anti-kink device according to claim 12, wherein the plurality of fastening protrusions and the plurality of fastening depressions are configured such that a plurality of fastening protrusions can at the same time each engage into one of the plurality of fastening depressions.

14. The anti-kink device according to claim 1, wherein the anti-kink device is made of a material that withstands sterilization methods.

15. The anti-kink device according to claim 14, wherein the anti-kink device is made of a material that withstands sterilization methods comprising treatment with gamma irradiation, ethylene oxide, electron rays, or hot steam.

16. The anti-kink device according to claim 4, wherein deforming the base body is accomplished by deep-drawing.

\* \* \* \* \*